(12) United States Patent
Goto

(10) Patent No.: US 7,710,076 B2
(45) Date of Patent: May 4, 2010

(54) BACK-GATE VOLTAGE GENERATOR CIRCUIT, FOUR-TERMINAL BACK GATE SWITCHING FET, AND CHARGE AND DISCHARGE PROTECTION CIRCUIT USING SAME

(75) Inventor: Tomoyuki Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 103 days.

(21) Appl. No.: 12/093,000

(22) PCT Filed: Aug. 14, 2007

(86) PCT No.: PCT/JP2007/066082

§ 371 (c)(1),
(2), (4) Date: May 8, 2008

(87) PCT Pub. No.: WO2008/035523

PCT Pub. Date: Mar. 27, 2008

(65) Prior Publication Data

US 2009/0121683 A1      May 14, 2009

(30) Foreign Application Priority Data

Sep. 19, 2006   (JP)   .............................. 2006-251999

(51) Int. Cl.
  *H02J 7/00*   (2006.01)
(52) U.S. Cl. .................. 320/134; 320/132; 320/152; 320/157; 320/158; 320/159; 320/162; 320/163; 320/164; 361/78; 361/79; 361/86; 361/87; 361/90; 361/93.9

(58) Field of Classification Search .................. 320/134
See application file for complete search history.

(56) References Cited

U.S. PATENT DOCUMENTS

| | | | | |
|---|---|---|---|---|
| 6,670,790 | B2* | 12/2003 | Stellberger | .................. 320/134 |
| 6,690,559 | B2* | 2/2004 | Yoshida | ..................... 361/100 |
| 2003/0122525 | A1* | 7/2003 | Stellberger | .................. 320/134 |
| 2006/0076931 | A1 | 4/2006 | Mandai | |

FOREIGN PATENT DOCUMENTS

| | | |
|---|---|---|
| JP | 7-227045 | 8/1995 |
| JP | 9-107075 | 4/1997 |
| JP | 2000-124780 | 4/2000 |
| JP | 2006-108568 | 4/2006 |
| JP | 2006-121900 | 5/2006 |
| JP | 2007-68390 | 3/2007 |

\* cited by examiner

*Primary Examiner*—Edward Tso
*Assistant Examiner*—Manuel Hernandez
(74) *Attorney, Agent, or Firm*—Cooper & Dunham LLP

(57) ABSTRACT

A back-gate voltage generator circuit generating a back-gate voltage of a four-terminal back gate switching MOSFET for charge and discharge control is disclosed. The back-gate voltage generator circuit includes first and second n-type MOSFETs connected in series through a common source electrode. A voltage at the common source electrode of the first and second n-type MOSFETS connected in series serves as the back-gate voltage of the four-terminal back gate switching MOSFET, and the back-gate voltage is used as a reference voltage for generating signals for controlling the first and second n-type MOSFETS.

9 Claims, 5 Drawing Sheets

| SEQUENCE | CONTROL SIGNAL | BG OUTPUT | TERMINAL OUTPUT VOLTAGE | PARASITIC DIODE | CHARGE | DISCHARGE | OUT | BACK GATE SWITCHING MOSFET |
|---|---|---|---|---|---|---|---|---|
| ORDINARY | LOW | V− | Vss = V− | V− ⇒ Vss | YES | YES | HIGH | ON |
| OVERCHARGED | LOW | V− | Vss > V− | V− ⇒ Vss | NO | YES | LOW | OFF |
| OVERDISCHARGED | HIGH | VSS | Vss < V− | Vss ⇒ V− | YES | NO | LOW | OFF |
| DISCHARGE OVERCURRENT | HIGH | VSS | Vss < V− | Vss ⇒ V− | YES | NO | LOW | OFF |
| CHARGE OVERCURRENT | LOW | V− | Vss > V− | V− ⇒ Vss | NO | YES | LOW | OFF |

BACK-GATE VOLTAGE GENERATOR CIRCUIT, FOUR-TERMINAL BACK GATE SWITCHING FET, AND CHARGE AND DISCHARGE PROTECTION CIRCUIT USING SAME

TECHNICAL FIELD

The present invention relates generally to techniques related to charge and discharge protection circuits for secondary batteries such as lithium-ion (Li-ion) secondary batteries, and more particularly to a technique for enabling protection of a secondary battery from overcharge, overdischarge, discharge overcurrent, and charge overcurrent by simply providing a single four-terminal back gate switching FET in a charge and discharge path.

Specifically, the present invention relates to a back-gate voltage generator circuit, a four-terminal back gate switching FET (Field-Effect Transistor) controlled by the back-gate voltage generator circuit, a charge and discharge protection circuit for a secondary battery using the four-terminal back gate switching FET, a battery pack containing the charge and discharge protection circuit, and an electronic apparatus such as a cellular phone using the battery pack.

BACKGROUND ART

Li-ion secondary batteries are often used in various portable electronic apparatuses that have been popular in recent years, such as cellular phones; digital cameras; small-size, light-weight audio apparatuses such as portable minidisk units; and game apparatuses. The Li-ion secondary battery involves the risk that metal Li deposits are formed to cause an accident when the battery is overcharged, and also has a problem in that the number of times of repeated charge and discharge use is reduced when the battery is overdischarged.

Accordingly, conventionally, two protection switches, one for overdischarge protection and the other for overcharge protection, are provided in the charge and discharge path between the secondary battery and an apparatus main body, and when the secondary battery is overcharged to be higher than or equal to a predetermined voltage or is overdischarged to be lower than or equal to a predetermined voltage, such overcharge or overdischarge is detected and a corresponding one of the protection switches is turned off, thereby preventing further overcharge or overdischarge.

Thus, the conventional charge and discharge protection circuit for a secondary battery requires a charge control MOSFET (Metal Oxide Silicon Field-Effect Transistor) for charge control and a discharge control MOSFET for discharge control as protection switches, and achieves charge and discharge protection for a battery pack by controlling the gate voltages of the charge control and discharge control MOSFETs. Further, conventionally, each of the charge control MOSFET and the discharge control MOSFET is a three-terminal IC, and the back gate potential is equal to the source potential. Accordingly, there is no need to control the back gate potential.

The source electrode of the charge control MOSFET is connected to the negative terminal of the battery pack, and the source electrode of the discharge control MOSFET is connected to the negative terminal of a battery cell. The direction of the parasitic diode of each MOSFET is fixed.

Japanese Laid-Open Patent Application No. 2006-121900 discloses a battery pack that employs the above-described two MOSFETs for charge control and discharge control.

FIG. 1 is a circuit diagram showing a battery pack 110 disclosed in Japanese Laid-Open Patent Application No. 2006-121900.

Referring to FIG. 1, the battery pack 110 includes a charge and discharge protection circuit 120, a discharge control FET Q1, a charge control FET Q2, a battery cell 112, capacitors C1, C2, and C3, and resistors r1 and r2.

The charge and discharge protection circuit 120 includes an overcharge detector circuit 122, an overdischarge detector circuit 127, an overcurrent detector circuit 125, delay circuits 126a and 126b, a level shifter 123, an abnormal charger detector circuit 128, a short circuit detector circuit 124, and n-type FETs Q3 and Q4.

The charge and discharge protection circuit 120 further includes a VDD terminal to which the positive terminal of the battery cell 112 is connected through the resistor r2, a VSS terminal to which the negative terminal of the battery cell 112 is connected, a V-terminal that detects discharge overcurrent and charge overcurrent, a Cout terminal that turns ON/OFF the charge control MOSFET Q2 that controls charge current, a Dout terminal that turns ON/OFF the discharge control MOSFET Q1 that controls discharge current, and a CT terminal for test shortening.

The Cout terminal and the Dout terminal are prevented from simultaneously turning OFF the discharge control MOSFET Q1 and the charge control MOSFET Q2. In an overcharged state or a charge overcurrent state, the output level of the Cout terminal output becomes LOW to turn OFF the charge control MOSFET Q2, thereby preventing charging, while the output level of the Dout terminal becomes HIGH to turn ON the discharge control MOSFET Q1, so that it is possible to perform discharge through the parasitic diode of the charge control MOSFET Q2.

Further, in an overdischarged state, a discharge overcurrent state, and a short-circuited state, the output level of the Dout terminal becomes LOW to turn OFF the discharge control MOSFET Q1, thereby preventing discharge, while the output level of the Cout terminal outputs becomes HIGH to turn ON the charge control MOSFET Q2, so that it is possible to perform charging through the parasitic diode of the discharge control MOSFET Q1.

According to the above-described conventional technique, it is possible to control charge and discharge separately, and the direction of the parasitic diode of each of the charge control and discharge control MOSFETs is fixed. Therefore, it is possible to provide protection relatively easily.

However, it is low-cost, space-saving products that are now sought after in the marketplace, and products lower in cost and greater in space-saving can be developed by forming a battery pack with one MOSFET capable of controlling both charge and discharge than with two conventional MOSFETs for control.

DISCLOSURE OF THE INVENTION

According to one aspect of the present invention, there are provided a back-gate voltage generator circuit that generates a back-gate voltage for performing on-off control on the charge and discharge path of a charge and discharge protection circuit with a single four-terminal back gate switching FET and controlling the direction of the parasitic diode of the four-terminal back gate switching FET in accordance with detection conditions such as overcharge, overdischarge, and overcurrent; a four-terminal back gate switching FET controlled by the back-gate voltage generator circuit; a charge and discharge protection circuit for a secondary battery using the four-terminal back gate switching FET; a battery pack containing the charge and discharge protection circuit; and an electronic apparatus such as a cellular phone using the battery pack.

According to one aspect of the present invention, there is provided a back-gate voltage generator circuit generating a back-gate voltage of a four-terminal back gate switching MOSFET for charge and discharge control, the back-gate voltage generator circuit including first and second n-type MOSFETs connected in series through a common source electrode, wherein a voltage at the common source electrode of the first and second n-type MOSFETS connected in series serves as the back-gate voltage of the four-terminal back gate switching MOSFET, and the back-gate voltage is used as a reference voltage for generating signals for controlling the first and second n-type MOSFETS.

According to one aspect of the present invention, there is provided a four-terminal back gate switching MOSFET for charge and discharge control controlled by the back-gate voltage generator circuit as set forth above.

According to one aspect of the present invention, there is provided a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including the four-terminal back gate switching MOSFET for charge and discharge control as set forth above as an FET for the charge and discharge control provided in a charge and discharge path.

According to one aspect of the present invention, there is provided a battery pack including the charge and discharge protection circuit as set forth above.

According one aspect of the present invention, there is provided an electronic apparatus including the battery pack as set forth above.

Examples of the electronic apparatus may include a cellular phone, a digital camera, an audio apparatus, and a game apparatus.

Thus, according to embodiments of the present invention, it is possible to provide a back-gate voltage generator circuit that generates a back-gate voltage for performing on-off control on the charge and discharge path of a charge and discharge protection circuit with a single four-terminal back gate switching FET and controlling the direction of the parasitic diode of the four-terminal back gate switching FET in accordance with detection conditions such as overcharge, overdischarge, and overcurrent; a four-terminal back gate switching FET controlled by the back-gate voltage generator circuit; a charge and discharge protection circuit for a secondary battery using the four-terminal back gate switching FET; a battery pack containing the charge and discharge protection circuit; and an electronic apparatus such as a cellular phone using the battery pack.

BRIEF DESCRIPTION OF THE DRAWINGS

Other objects, features and advantages of the present invention will become more apparent from the following detailed description when read in conjunction with the accompanying drawings, in which:

FIG. 5 is a table showing conditions in each operational sequence for illustrating operations according to the embodiment of the present invention.

BEST MODE FOR CARRYING OUT THE INVENTION

A description is given, with reference to the accompanying drawings, of an embodiment of the present invention.

Figure 2:
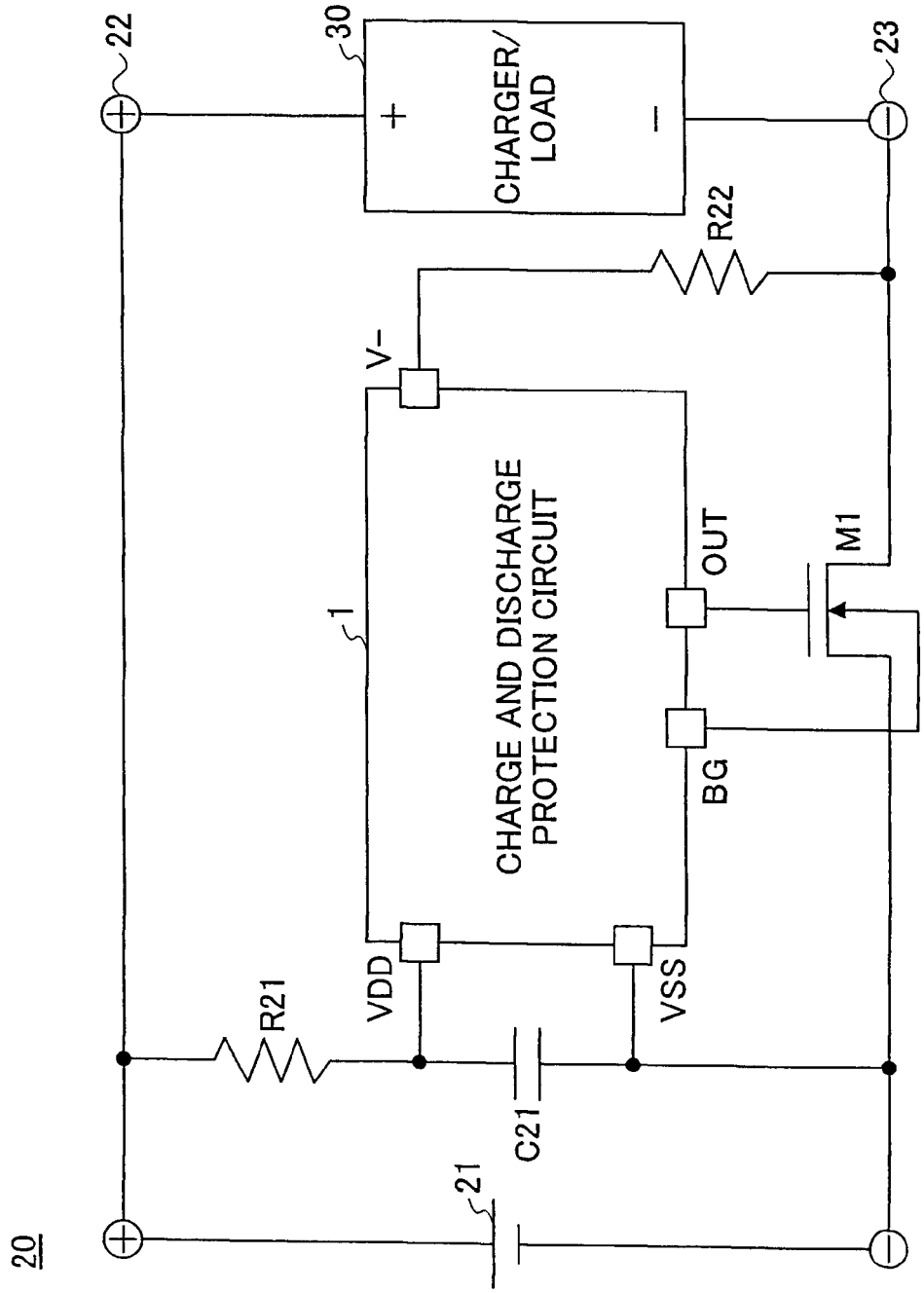
FIG. 2 is a schematic circuit diagram showing a battery pack including a charge and discharge protection circuit according to an embodiment of the present invention.

FIG. 2 is a schematic circuit diagram showing a battery pack 20 including a charge and discharge protection circuit 1 and a four-terminal back gate switching FET M1 according to the embodiment of the present invention.

Referring to FIG. 2, the charge and discharge protection circuit 1 according to this embodiment includes a VDD terminal to which the positive terminal of a battery cell 21 is connected through a resistor 21; a VSS terminal to which the negative terminal of the battery cell 21 is connected, a V-terminal for detecting discharge overcurrent and charge overcurrent; a BG terminal for controlling the back-gate voltage of the four-terminal back gate switching FET M1, the BG terminal being connected to the back gate of the four-terminal back gate switching FET M1; and an OUT terminal for performing on-off control on the four-terminal back gate switching FET M1, the OUT terminal being connected to the gate terminal of the four-terminal back gate switching FET M1. The charge and discharge protection circuit 1 may further include a test terminal for shortening a delay time.

The battery pack 20 shown in FIG. 2 operates as follows. (See FIG. 5 for the conditions at the time of each operation.)

(a) In an ordinary state (that is, a normal state), the output level of the OUT terminal is HIGH, the BG terminal outputs the V− voltage of the charge and discharge protection circuit, and the four-terminal back gate switching FET M1 is ON. In this state, both charge and discharge are performable.

(b) In an overcharged state, the output level of the OUT terminal is LOW, the BG terminal outputs the V− voltage of the charge and discharge protection circuit 1, and the four-terminal back gate switching FET M1 is OFF to stop charging. At this point, the parasitic diode of the four-terminal back gate switching FET M1 is arranged in a direction in which a current flows from the negative terminal of a charger or load (charger/load) 30 to the negative terminal of the battery cell 21, and it is possible to perform discharging.

(c) In an overdischarged state, the output level of the OUT terminal is LOW, the BG terminal outputs the VSS voltage of the charge and discharge protection circuit 1, and the four-terminal back gate switching FET M1 is OFF to stop discharging. At this point, the parasitic diode of the four-terminal back gate switching FET M1 is in a direction in which a current flows from the negative terminal of the battery cell 21 to the negative terminal of the charger/load 30, and it is possible to perform charging.

(d) In a discharge overcurrent state, the output level of the OUT terminal is LOW, the BG terminal outputs the VSS voltage of the charge and discharge protection circuit 1, and the four-terminal back gate switching FET M1 is OFF to stop discharge. At this point, the parasitic diode of the four-terminal back gate switching FET M1 is in the direction in which a current flows from the negative terminal of the battery cell 21 to the negative terminal of the charger/load 30, and it is possible to perform charging.

(e) In a charge overcurrent state, the output level of the OUT terminal is LOW, the BG terminal outputs the V− voltage of the charge and discharge protection circuit 1, and the four-terminal back gate switching FET M1 is OFF to stop charging. At this point, the parasitic diode of the four-terminal back gate switching FET M1 is in the direction in which a current flows from the negative terminal of the charger/load 30 to the negative terminal of the battery cell 21, and it is possible to perform discharging.

Figure 3:
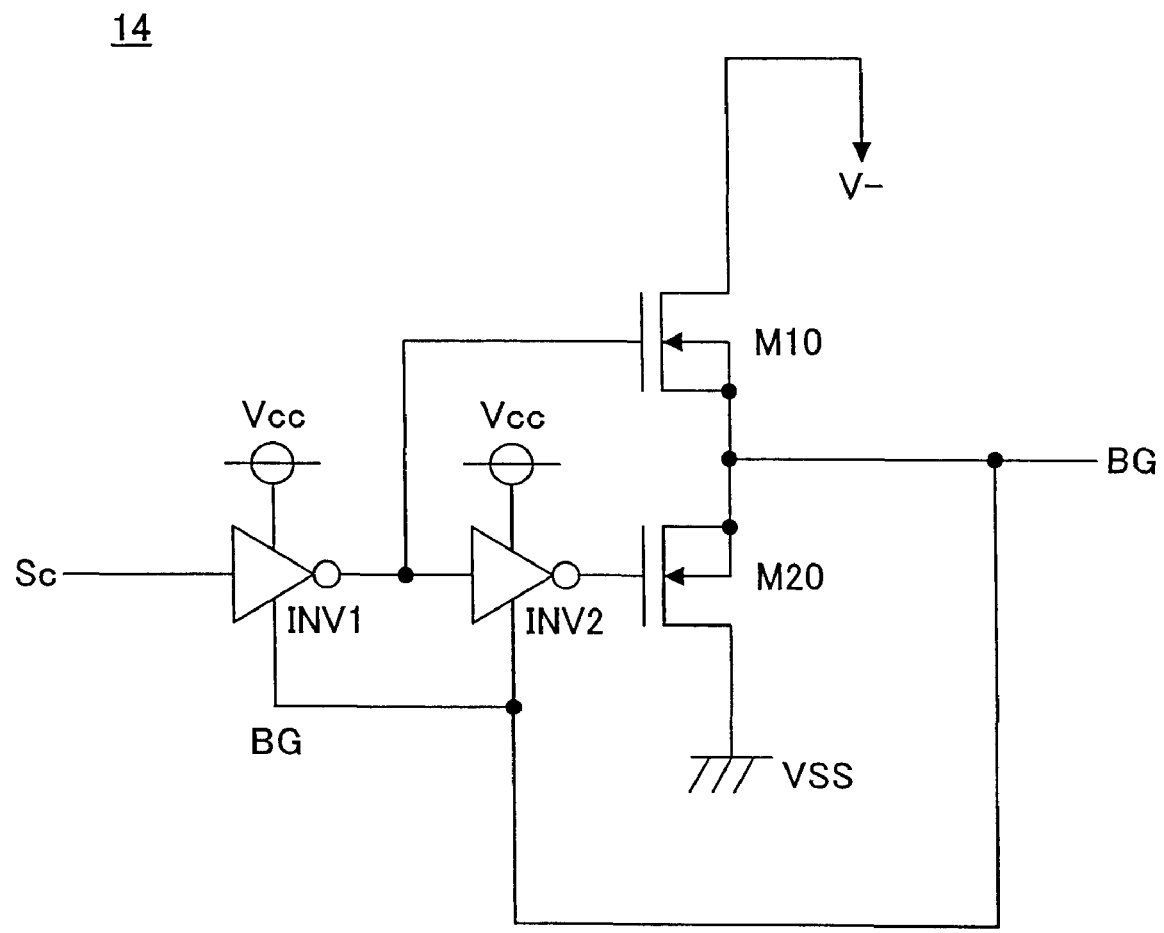
FIG. 3 is a circuit diagram showing a back-gate voltage generator circuit for controlling the back gate of a four-terminal back gate switching FET provided in the charge and discharge protection circuit according to the embodiment of the present invention.

FIG. 3 is a circuit diagram showing a back-gate voltage generator circuit 14 for generating a back-gate voltage that controls the back gate of the four-terminal back gate switching FET M1. The back-gate voltage generator circuit 14 is contained in the charge and discharge protection circuit 1.

The back-gate voltage generator circuit 14 includes an n-type MOSFET M10 and an n-type MOSFET M20, of which one is selected for the back-gate voltage. The back-gate voltage generator circuit 14 further includes an inverter INV1 and an inverter INV2. The connection (common source electrode) of the n-type MOSFETS M10 and M20 is also connected to each of the inverters INV1 and INV2, so that the gate voltage of each of the n-type MOSFETs M10 and M20 is input using the back-gate voltage as a basis.

In the ordinary state (normal state), when a low-level signal is input as a control signal Sc, the control signal Sc is inverted through the inverter INV1 so that a high-level signal is input to the gate of the n-type MOSFET M10. At the same time, the inverted signal is further inverted through the inverter INV2 so that a low-level signal is input to the gate of the n-type MOSFET M20.

At this point, the n-type MOSFET M10 is ON, and the n-type MOSFET M20 is OFF. At this point, since the four-terminal back gate switching FET M1 is ON, the voltage at the negative terminal of the battery cell 21, the voltage at the negative terminal of the charger/load 30, and the V− voltage through a resistor R22 in FIG. 2 are substantially the same. Accordingly, no current flows through the parasitic diode of the n-type MOSFET M20.

In the overcharged state, a low-level signal is input as the control signal Sc, so that a high-level signal is input to the gate of the n-type MOSFET M10 and a low-level signal is input to the gate of the n-type MOSFET M20. At this point, the n-type MOSFET M10 is ON, and the n-type MOSFET M20 is OFF. At this point, the four-terminal back gate switching FET M1 is OFF.

Immediately before detection of overcharge, the battery cell 21 has been charged with a charger voltage greater than the voltage of the battery cell 21. Therefore, at the same time that charging is prevented, the relationship between the VSS voltage and the V− voltage becomes "VSS>V−." Accordingly, the direction is opposite, so that no current flows through the parasitic diode of the n-type MOSFET M20.

In the overdischarged state, a high-level signal is input as the control signal Sc, so that a low-level signal is input to the gate of the n-type MOSFET M10 and a high-level signal is input to the gate of the n-type MOSFET M20. At this point, the n-type MOSFET M10 is OFF, and the n-type MOSFET M20 is ON. At this point, the four-terminal back gate switching FET M1 is OFF.

Immediately before detection of overdischarge, the battery cell 21 has been discharged because of connection of the battery pack 20 to the load 30. At the same time that discharge is prevented, the V− potential is pulled up to the VDD level inside the charge and discharge protection circuit 1, so that the relationship between the VSS voltage and the V− voltage becomes "VSS<V−." Accordingly, the direction is opposite, so that no current flows through the parasitic diode of the n-type MOSFET M10.

In the discharge overcurrent state, a high-level signal is input as the control signal Sc, so that a low-level signal is input to the gate of the n-type MOSFET M10 and a high-level signal is input to the gate of the n-type MOSFET M20. At this point, the n-type MOSFET M10 is OFF, and the n-type MOSFET M20 is ON. At this point, the four-terminal back gate switching FET M1 is OFF.

Immediately before detection of discharge overcurrent, the battery cell 21 has been discharged because of connection of the battery pack 20 to the load 30. At the same time that discharge is prevented, the discharge path is lost, so that the relationship between the VSS voltage and the V− voltage becomes "VSS<V−." Accordingly, the direction is opposite, so that no current flows through the parasitic diode of the n-type MOSFET M10.

In the charge overcurrent state, a low-level signal is input as the control signal Sc, so that a high-level signal is input to the gate of the n-type MOSFET M10 and a low-level signal is input to the gate of the n-type MOSFET M20. At this point, the n-type MOSFET M10 is ON, and the n-type MOSFET M20 is OFF. At this point, the four-terminal back gate switching FET M1 is OFF.

Immediately before detection of charge overcurrent, the battery cell 21 has been charged with a charger voltage greater than the battery cell 21. Therefore, at the same time that charging is prevented, the relationship between the VSS voltage and the V− voltage becomes "VSS>V−." Accordingly, the direction is opposite, so that no current flows through the parasitic diode of the n-type MOSFET M20.

Figure 4:
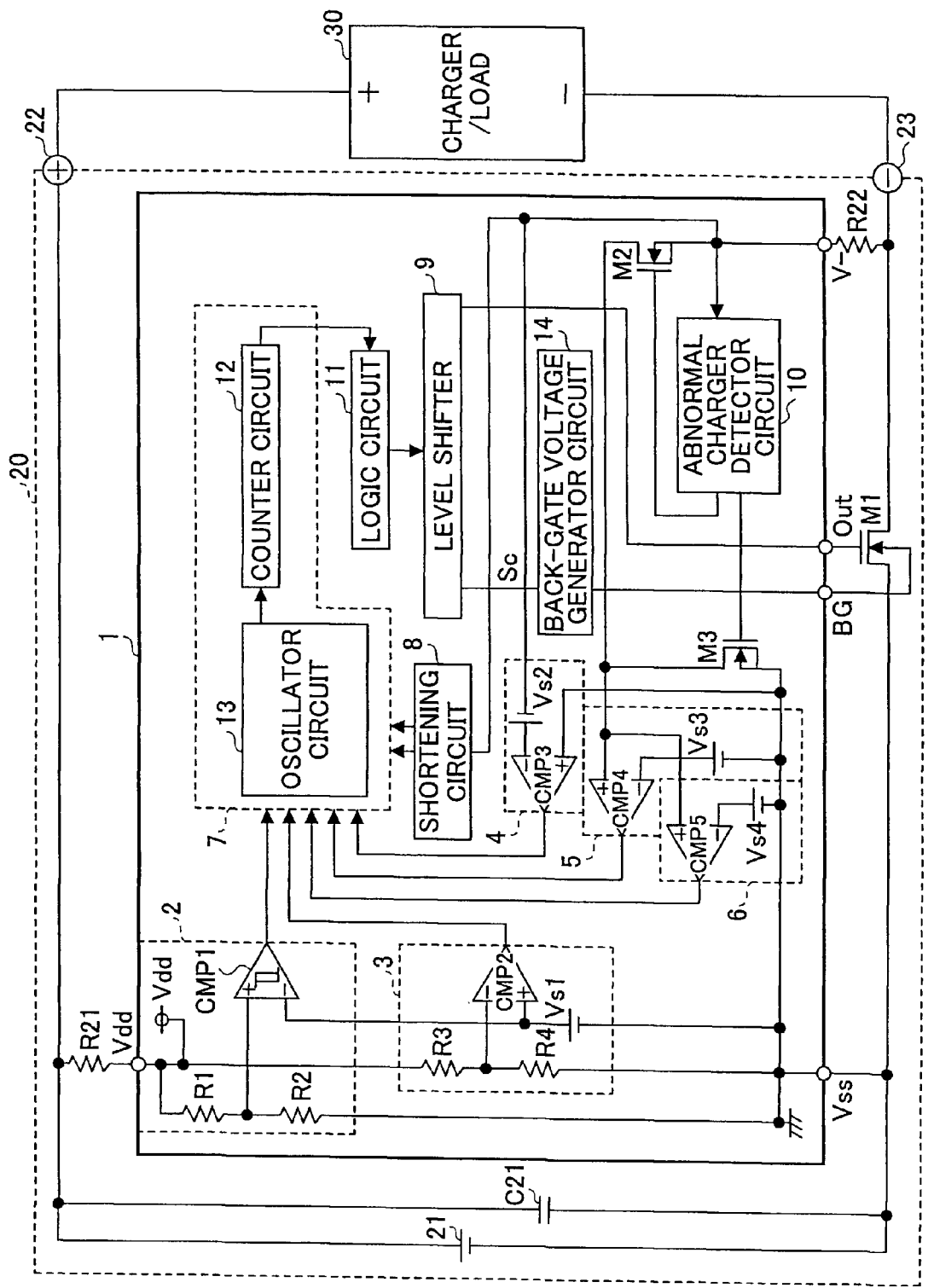
FIG. 4 is another circuit diagram showing the battery pack containing a secondary battery protection IC containing the back-gate voltage generator circuit according to the embodiment of the present invention.

FIG. 4 is another circuit diagram showing the battery pack 20 containing a secondary battery protection IC containing the back-gate voltage generator circuit 14 according to the embodiment of the present invention. In FIG. 4, the same elements as those of FIG. 2 are referred to by the same reference numerals.

Referring to FIG. 4, the battery pack 20 includes the charge and discharge protection circuit (protection IC having an IC configuration) 1, the four-terminal back gate switching FET M1, which is an n-type MOSFET, the battery cell (secondary battery) 21, a capacitor C21, the resistors R21 and R22, a positive-side terminal 22, and a negative-side terminal 23. The charger/load 30 is a charger at the time of charging or a load device such as a cellular phone; a digital camera; an audio apparatus; or a game apparatus at the time of discharging.

The protection IC 1 includes an overcharge detector circuit 2, an overdischarge detector circuit 3, a charge overcurrent detector circuit 4, a first discharge overcurrent detector circuit 5, a second discharge overcurrent detector circuit 6, a delay time generator circuit 7, a shortening circuit 8, a level shifter 9, an abnormal charger detector circuit 10, a logic circuit 11, the back-gate voltage generator circuit 14 (described in detail with reference to FIG. 3), and the four-terminal n-type MOSFET M1. The delay time generator circuit 7 includes a counter 12 and an oscillator circuit 13.

Figure 1:
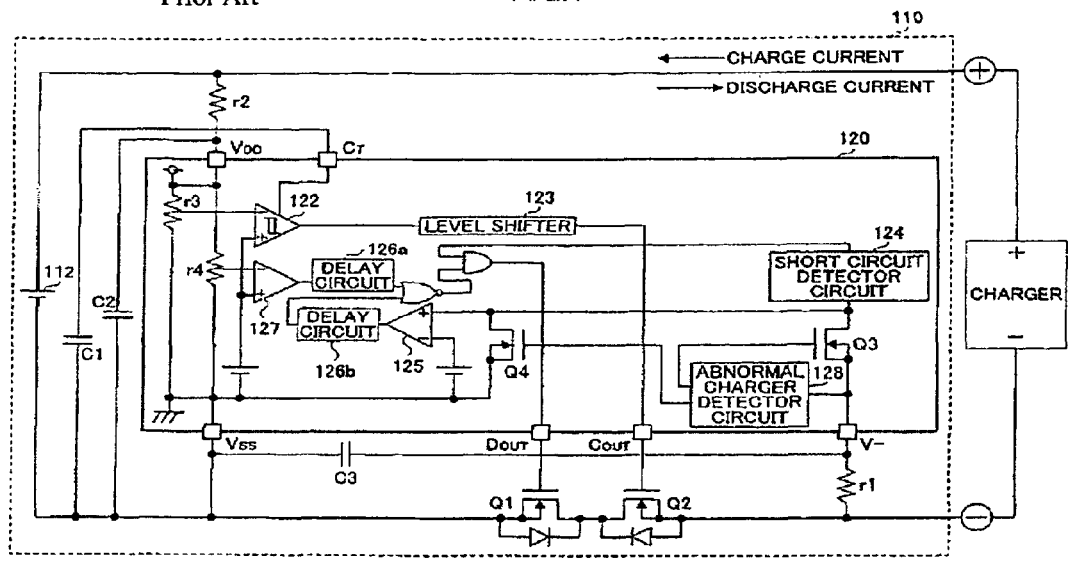
FIG. 1 is a circuit diagram showing a conventional battery pack.

The protection IC 1 further includes the charge and discharge control terminal OUT for controlling the gate voltage of the four-terminal n-type MOSFET M1, the back gate control terminal BG for controlling the back-gate voltage of the four-terminal n-type MOSFET M1, and the current detection terminal V− for detecting charge/discharge current by converting the charge/discharge current into voltage. Although omitted in FIG. 4, the same short circuit detector circuit as the conventional short circuit detector circuit 124 shown in FIG. 1 may be provided so as to input a detection signal to the delay time generator circuit 7 at the time of detecting a short circuit, thereby making it possible to perform protection control at the time of detecting a short circuit as well.

The level shifter 9 outputs a gate signal applied to the gate of the four-terminal n-type MOSFET M1 for charge and discharge control and the control signal Sc input to the back-gate voltage generator circuit 14. The control signal Sc is HIGH at the time of the ordinary state, detection of overcharge, and detection of charge overcurrent, and is LOW at the time of detection of overdischarge and detection of discharge overcurrent. The back-gate voltage generator circuit 14 has the configuration described in detail with reference to FIG. 3.

The outputs of the overcharge detector circuit 2, the overdischarge detector circuit 3, the charge overcurrent detector circuit 4, the first discharge overcurrent detector circuit 5, and the second discharge overcurrent detector circuit 6 are input to the delay time generator circuit 7. Each of these output signals is delayed for a predetermined delay time by the delay time generator circuit 7 to be output to the logic circuit 11, and is thereafter converted into a reference voltage in the level shifter 9. The signal from the level shifter 9 is directly applied to the gate of the four-terminal n-type MOSFET M1. The control signal Sc from the level shifter 9 is input to the back-gate voltage generator circuit 14 to generate a back-gate signal (BG), and the generated back-gate signal (BG) is applied to the back gate of the four-terminal n-type MOSFET M1. Thereby, on-off control is performed on the four-terminal n-type MOSFET M1 and the direction of the parasitic diode of the four-terminal n-type MOSFET M1 is controlled as described above.

The above-described predetermined delay time is not uniform through all the input signals, and takes a predetermined value based on the contents of detection. The details of the delay time are described in many patent documents and are well known. Accordingly, a description thereof is omitted.

FIG. 5 shows the above-described operations according to the embodiment of the present invention. FIG. 5 shows a brief list of the conditions of the control signal Sc, the BG output, the terminal voltage, the direction of the parasitic diode, performability of charge and discharge, the gate signal of the four-terminal back gate switching n-type MOSFET M1, and ON/OFF of the four-terminal back gate switching n-type MOSFET M1 in each of the operational sequences at the ordinary (normal) time, at the time of detection of overcharge, at the time of detection of overdischarge, at the time of detection of discharge overcurrent, and at the time of detection of charge overcurrent.

By building the back-gate voltage generator circuit 14 having the above-described configuration into the charge and discharge protection circuit 1, a battery pack using a four-terminal back gate switching MOSFET can be achieved.

Further, the battery pack thus achieved can be applied to a wide range of electronic apparatuses such as cellular phones, digital cameras, audio apparatuses such as small-size, lightweight portable minidisk units, and game apparatuses, which have been popular in recent years.

According to one aspect of the present invention, there is provided a back-gate voltage generator circuit generating the back-gate voltage of a four-terminal back gate switching MOSFET for charge and discharge control, the back-gate voltage generator circuit including first and second n-type MOSFETs connected in series through a common source electrode, wherein a voltage at the common source electrode of the first and second n-type MOSFETS connected in series serves as the back-gate voltage of the four-terminal back gate switching MOSFET, and the back-gate voltage is used as a reference voltage for generating signals for controlling the first and second n-type MOSFETS.

According to one aspect of the present invention, there is provided a four-terminal back gate switching MOSFET for charge and discharge control controlled by the back-gate voltage generator circuit as set forth above.

According to one aspect of the present invention, there is provided a charge and discharge protection circuit protecting a secondary battery from overcharge, overdischarge, discharge overcurrent, and charge overcurrent by detecting the overcharge, overdischarge, discharge overcurrent, and charge overcurrent of the secondary battery, the charge and discharge protection circuit including the four-terminal back gate switching MOSFET for charge and discharge control as set forth above as an FET for charge and discharge control provided in a charge and discharge path.

According to one aspect of the present invention, there is provided a battery pack including the charge and discharge protection circuit as set forth above.

According one aspect of the present invention, there is provided an electronic apparatus including the battery pack as set forth above.

Examples of the electronic apparatus may include a cellular phone, a digital camera, an audio apparatus, and a game apparatus.

The back-gate voltage generator circuit as set forth above may further include a first inverter to which a control signal generated from one of detection signals of overcharge, overdischarge, discharge overcurrent, and charge overcurrent of a secondary battery is input; and a second inverter to which the output of the first inverter is input, wherein the output of the first inverter may be input to the gate of the first n-type MOSFET, the output of the second inverter may be input to the gate of the second n-type MOSFET, and the back-gate voltage may be used as a ground-side reference potential of each of the first inverter and the second inverter.

Thus, according to embodiments of the present invention, it is possible to provide a back-gate voltage generator circuit that generates a back-gate voltage for performing on-off control on the charge and discharge path of a charge and discharge protection circuit with a single four-terminal back gate switching FET and controlling the direction of the parasitic diode of the four-terminal back gate switching FET in accordance with detection conditions such as overcharge, overdischarge, and overcurrent; a four-terminal back gate switching FET controlled by the back-gate voltage generator circuit; a charge and discharge protection circuit for a secondary battery using the four-terminal back gate switching FET; a battery pack containing the charge and discharge protection circuit; and an electronic apparatus such as a cellular phone using the battery pack.

Further, it is possible to generate an output for back gate control without causing unnecessary currents due to the parasitic diodes of the n-type MOS transistors to flow.

The present invention is not limited to the specifically disclosed embodiment, and variations and modifications may be made without departing from the scope of the present invention.

The present application is based on Japanese Priority Patent Application No. 2006-251999, filed on Sep. 19, 2006, the entire contents of which are hereby incorporated by reference.

The invention claimed is:

1. A back-gate voltage generator circuit generating a back-gate voltage of a four-terminal back gate switching MOSFET for charge and discharge control, the back-gate voltage generator circuit comprising:
   first and second n-type MOSFETs connected in series through a common source electrode,
   wherein a voltage at the common source electrode of the first and second n-type MOSFETS connected in series serves as the back-gate voltage of the four-terminal back gate switching MOSFET, and the back-gate voltage is used as a reference voltage for generating signals for controlling the first and second n-type MOSFETS, and
   a first inverter to which a control signal generated from one of detection signals of overcharge, overdischarge, discharge overcurrent, and charge overcurrent of a secondary battery is input, and
   a second inverter to which an output of the first inverter is input,
   wherein the output of the first inverter is input to a gate of the first n-type MOSFET,
   an output of the second inverter is input to a gate of the second n-type MOSFET, and
   the back-gate voltage is used as a ground-side reference potential of each of the first inverter and the second inverter.

2. A four-terminal back gate switching MOSFET for charge and discharge control controlled by the back-gate voltage generator circuit as set forth in claim 1.

3. A charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit comprising:
   a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

4. A battery pack, comprising:
   a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

5. An electronic apparatus, comprising:
   a battery pack including a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

6. A cellular phone, comprising:
   a battery pack including a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

7. A digital camera, comprising:
   a battery pack including a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

8. An audio apparatus, comprising:
   a battery pack including a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

9. A game apparatus, comprising:
   a battery pack including a charge and discharge protection circuit protecting a secondary battery from overcharge, overdischarge, discharge overcurrent, and charge overcurrent by detecting the overcharge, the overdischarge, the discharge overcurrent, and the charge overcurrent of the secondary battery, the charge and discharge protection circuit including a four-terminal back gate switching MOSFET for charge and discharge control as an FET for the charge and discharge control provided in a charge and discharge path, the four-terminal back gate switching MOSFET being controlled by the back-gate voltage generator circuit as set forth in claim 1.

* * * * *